(12) United States Patent
Saurabh et al.

(10) Patent No.: US 7,984,502 B2
(45) Date of Patent: **\*Jul. 19, 2011**

(54) PATTERN DISCOVERY IN A NETWORK SYSTEM

(75) Inventors: Kumar Saurabh, Mountain View, CA (US); Kenny C. Tidwell, Los Altos, CA (US)

(73) Assignee: Hewlett-Packard Development Company, L.P., Houston, TX (US)

( \* ) Notice: Subject to any disclaimer, the term of this patent is extended or adjusted under 35 U.S.C. 154(b) by 293 days.

This patent is subject to a terminal disclaimer.

(21) Appl. No.: 12/243,838

(22) Filed: Oct. 1, 2008

(65) Prior Publication Data

US 2009/0064333 A1    Mar. 5, 2009

Related U.S. Application Data

(63) Continuation of application No. 10/839,613, filed on May 4, 2004, now Pat. No. 7,509,677.

(51) Int. Cl.
*G06F 7/04* (2006.01)
*G06F 12/14* (2006.01)
*H04L 9/00* (2006.01)

(52) U.S. Cl. .............. 726/23; 726/22; 726/24; 726/25; 726/26; 726/27; 713/182; 713/188

(58) Field of Classification Search .............. 726/23
See application file for complete search history.

(56) References Cited

U.S. PATENT DOCUMENTS

| | | | |
|---|---|---|---|
| 5,557,742 A | 9/1996 | Smaha et al. | |
| 5,717,919 A | 2/1998 | Kodavalla et al. | |
| 5,850,516 A | 12/1998 | Schneier | |
| 5,956,404 A | 9/1999 | Schneier et al. | |
| 5,978,475 A | 11/1999 | Schneier et al. | |
| 6,070,244 A | 5/2000 | Orchier et al. | |
| 6,134,664 A | 10/2000 | Walker | |
| 6,192,034 B1 | 2/2001 | Hsieh et al. | |
| 6,275,942 B1 | 8/2001 | Bernhard et al. | |
| 6,321,338 B1 | 11/2001 | Porras et al. | |
| 6,408,391 B1 | 6/2002 | Huff et al. | |
| 6,408,404 B1 | 6/2002 | Ladwig | |
| 6,453,345 B2 * | 9/2002 | Trcka et al. ............... 709/224 |
| 6,484,203 B1 | 11/2002 | Porras et al. | |
| 6,542,075 B2 | 4/2003 | Barker et al. | |
| 6,694,362 B1 | 2/2004 | Secor et al. | |
| 6,704,874 B1 | 3/2004 | Porras et al. | |
| 6,708,212 B2 | 3/2004 | Porras et al. | |
| 6,711,615 B2 | 3/2004 | Porras et al. | |

(Continued)

FOREIGN PATENT DOCUMENTS

GB    2391650 A    2/2004

(Continued)

OTHER PUBLICATIONS

U.S. Appl. No. 60/405,921, filed Aug. 26, 2002, Gisby et al.

(Continued)

*Primary Examiner* — Longbit Chai

(57) ABSTRACT

Patterns can be discovered in events collected by a network system. In one embodiment, the present invention includes collecting and storing events from a variety of monitor devices. In one embodiment, a subset of the stored events is provided to a manager as an event stream. In one embodiment, the present invention further includes the manager discovering one or more previously unknown event patterns in the event stream.

26 Claims, 4 Drawing Sheets

U.S. PATENT DOCUMENTS

| | | | |
|---|---|---|---|
| 6,839,850 B1 | 1/2005 | Campbell et al. | |
| 6,928,556 B2 | 8/2005 | Black et al. | |
| 6,966,015 B2 | 11/2005 | Steinberg et al. | |
| 6,985,920 B2 | 1/2006 | Bhattacharya et al. | |
| 6,988,208 B2 | 1/2006 | Hrabik et al. | |
| 7,039,953 B2 * | 5/2006 | Black et al. | 726/14 |
| 7,043,727 B2 | 5/2006 | Bennett et al. | |
| 7,089,428 B2 | 8/2006 | Farley et al. | |
| 7,127,743 B1 | 10/2006 | Khanolkar et al. | |
| 7,143,444 B2 | 11/2006 | Porras et al. | |
| 7,159,237 B2 | 1/2007 | Schneier et al. | |
| 7,168,093 B2 | 1/2007 | Hrabik et al. | |
| 7,171,689 B2 | 1/2007 | Beavers | |
| 7,219,239 B1 | 5/2007 | Njemanze et al. | |
| 7,260,844 B1 | 8/2007 | Tidwell et al. | |
| 7,278,160 B2 | 10/2007 | Black et al. | |
| 7,308,689 B2 | 12/2007 | Black et al. | |
| 7,318,178 B2 | 1/2008 | Steinberg et al. | |
| 7,333,999 B1 | 2/2008 | Njemanze | |
| 7,340,776 B2 | 3/2008 | Zobel et al. | |
| 7,370,359 B2 | 5/2008 | Hrabik et al. | |
| 7,376,969 B1 | 5/2008 | Njemanze et al. | |
| 7,379,993 B2 | 5/2008 | Valdes et al. | |
| 7,418,733 B2 | 8/2008 | Connary et al. | |
| 7,424,742 B1 | 9/2008 | Dash et al. | |
| 7,437,359 B2 | 10/2008 | Aguilar-Macias et al. | |
| 7,483,972 B2 | 1/2009 | Bhattacharya et al. | |
| 7,644,365 B2 | 1/2010 | Bhattacharya et al. | |
| 2002/0019945 A1 | 2/2002 | Houston et al. | |
| 2002/0091680 A1 | 7/2002 | Hatzis et al. | |
| 2002/0147803 A1 | 10/2002 | Dodd et al. | |
| 2002/0184532 A1 | 12/2002 | Hackenberger et al. | |
| 2003/0084349 A1 | 5/2003 | Friedrichs et al. | |
| 2003/0093692 A1 | 5/2003 | Porras | |
| 2003/0188189 A1 | 10/2003 | Desai et al. | |
| 2003/0221123 A1 | 11/2003 | Beavers | |
| 2004/0010718 A1 | 1/2004 | Porras et al. | |
| 2004/0015719 A1 * | 1/2004 | Lee et al. | 713/201 |
| 2004/0024864 A1 | 2/2004 | Porras et al. | |
| 2004/0221191 A1 | 11/2004 | Porras et al. | |
| 2005/0027845 A1 | 2/2005 | Secor et al. | |
| 2005/0251860 A1 | 11/2005 | Saurabh et al. | |
| 2006/0095587 A1 | 5/2006 | Bhattacharya et al. | |
| 2006/0212932 A1 | 9/2006 | Patrick et al. | |
| 2007/0118905 A1 | 5/2007 | Morin et al. | |
| 2007/0136437 A1 | 6/2007 | Shankar et al. | |
| 2007/0150579 A1 | 6/2007 | Morin et al. | |
| 2007/0162973 A1 | 7/2007 | Schneier et al. | |
| 2007/0169038 A1 | 7/2007 | Shankar et al. | |
| 2007/0234426 A1 | 10/2007 | Khanolkar et al. | |
| 2008/0104046 A1 | 5/2008 | Singla et al. | |
| 2008/0104276 A1 | 5/2008 | Lahoti et al. | |
| 2008/0162592 A1 | 7/2008 | Huang et al. | |
| 2008/0165000 A1 | 7/2008 | Morin et al. | |
| 2010/0058165 A1 | 3/2010 | Bhattacharya et al. | |

FOREIGN PATENT DOCUMENTS

| | | |
|---|---|---|
| KR | 2002 043994 A | 6/2002 |
| WO | WO 02/45315 A2 | 6/2002 |
| WO | WO 02/060117 A1 | 8/2002 |
| WO | WO 02/078262 A1 | 10/2002 |
| WO | WO 02/101988 A2 | 12/2002 |
| WO | WO 03/009531 A2 | 1/2003 |
| WO | WO 2004/019186 A2 | 3/2004 |
| WO | WO 2005/001655 | 1/2005 |
| WO | WO 2005/026900 | 3/2005 |

OTHER PUBLICATIONS

U.S. Appl. No. 10/308,767, filed Dec. 2, 2002.
U.S. Appl. No. 10/308,548, filed Dec. 2, 2002.
U.S. Appl. No. 10/308,941, filed Dec. 2, 2002.
U.S. Appl. No. 10/308,416, filed Dec. 2, 2002.
U.S. Appl. No. 10/308,418, filed Dec. 2, 2002.
U.S. Appl. No. 10/308,417, filed Dec. 2, 2002.
U.S. Appl. No. 10/308,584, filed Dec. 2, 2002.
U.S. Appl. No. 10/733,073, filed Dec. 10, 2003.
U.S. Appl. No. 10/713,471, filed Nov. 14, 2003.
U.S. Appl. No. 10/683,221, filed Oct. 10, 2003.
U.S. Appl. No. 10/683,191, filed Oct. 10, 2003.
U.S. Appl. No. 10/821,459, filed Apr. 9, 2004.
U.S. Appl. No. 10/839,563, filed May 4, 2004.
U.S. Appl. No. 10/975,962, filed Oct. 27, 2004.
U.S. Appl. No. 10/974,105, filed Oct. 27, 2004.
U.S. Appl. No. 11/029,920, filed Jan. 4, 2005.
U.S. Appl. No. 11/021,601, filed Dec. 23, 2004.
U.S. Appl. No. 11/070,024, filed Mar. 1, 2005.
U.S. Appl. No. 11/740,203, filed Apr. 25, 2007.
U.S. Appl. No. 11/836,251, filed Aug. 9, 2007.
U.S. Appl. No. 12/098,322, filed Apr. 4, 2008.
U.S. Appl. No. 11/023,942, filed Dec. 24, 2004, pp. 1-26.
Han, J., et al., "Mining Frequent Patterns without Candidate Generation," Proceedings of the 2000 ACM SIGMOD International Conference on Management of Data (SIGMOD '00), Dallas, TX, May 2000.
Han, J., et al., "Mining Frequent Patterns without Candidate Generation: A Frequent-Pattern Tree Approach," Data Mining and Knowledge Discovery: An International Journal, Jan. 2004, vol. 8, Issue 1, pp. 53-87, Kluwer Academic Publishers.
Examination Report, European Patent Application No. 05746753.2, Sep. 3, 2007, 3 Pages.
Abraham, T., "IDDM: Intrusion Detection Using Data Mining Techniques," DSTO-GD-0286, Information Technology Division, AR-011-868, Electronics and Surveillance Research Laboratory, Defence Science & Technology Organisation (DSTO), Australia Department of Defence, May 2001.
Hipp, J., et al., "Algorithms for Association Rule Mining—A General Survey and Comparison", ACM Special Interest Group on Knowledge Discovery and Data Mining (SIGKDD) Explorations Newsletter, Jul. 2000, vol. 2, Issue 1, pp. 58-64.
Hossain, M., et al., "A Framework for an Adaptive Intrusion Detection System with Data Mining", Proceedings: 13th Annual Canadian Information Technology Security Symposium (CITSS), Ottawa, Canada, 2001.
Lee, W., et al., "Data Mining Approaches for Intrusion Detection," Proceedings: 7th USENIX Security Symposium, Jan. 26-29, 1998, San Antonio, TX, vol. 1.
Perrochon, L., et al., "Enlisting Event Patterns for Cyber Battlefield Awareness," Proceedings: DARPA Information Survivability Conference & Exposition (DISCEX), Jan. 25-27, 2000,Hilton Head, South Carolina, vol. 2., IEEE Computer Society Press.
Heberlein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.
Javitz, H. S., et al., "The NIDES Statistical Component Description and Justification," SRI Project 3131, Contract N00039-92-C-0015, Annual Report, A010, Mar. 7, 1994.
Jou, Y. F., et al., "Architecture Design of a Scalable Intrusion Detection System for the Emerging Network Infrastructure," MCNC, Technical Report CDRL A005, Apr. 1997.
Porras, P. A., et al., "Live Traffic Analysis of TCP/IP Gateways," Symposium on Networks and Distributed Systems Security, Internet Society, Mar. 1998.
Robinson, S. L., "Memorandum Opinion" in *SRI International, Inc. v. Internet Security Systems, Inc. and Symantec Corporation* (D. Del., Civ. No. Apr. 1199-SLR), Oct. 17, 2006.
Valdes, A., et al., "Statistical Methods for Computer Usage Anomaly Detection Using NIDES (Next-Generation Intrusion Detection Expert System)," Proceedings of the Third International Workshop on Rough Sets and Soft Computing (RSSC 94), Jan. 27, 1995, San Jose, CA, pp. 306-311.
Arcsight, "About ArcSight Team," date unknown, [online] [Retrieved on Oct. 25, 2002] Retrieved from the Internet <URL: http://www.arcsight.com/about_team.htm>.
Arcsight, "About Overview," Oct. 14, 2002, [online] [Retrieved on Apr. 21, 2006] Retrieved from the Internet <Url: http://web.archive.org/web/20021014041614/http://www.arcsight.com/about.htm>.
Arcsight, "Contact Info," date unknown, [online] [Retrieved on Oct. 25, 2002] Retrieved from the Internet <URL: http://www.arcsight.com/contact.htm>.

Arcsight, "Enterprise Coverage: Technology Architecture," date unknown, [online] Retrieved from the Internet <URL: http://www.snaiso.com/Documentation/Arcsight/arcsight_archdta.pdf>.
Arcsight, "Managed Process: ArcSight Reporting System," date unknown, [online] Retrieved from the Internet <URL: http://www.snaiso.com/Documentation/Arcsight/arcsight_reportsys.pdf>.
Arcsight, "Managed Process: Console-Based Management," date unknown, [online] Retrieved from the Internet <URL: http://www.snaiso.com/Documentation/Arcsight/arcsight_console.pdf >.
Arcsight, "Precision Intelligence: SmartRules™ and Cross-Correlation," date unknown, [online] Retrieved from the Internet <URL: http://www.snaiso.com/Documentation/Arcsight/arcsight_correlation.pdf>.
Arcsight, "Precision Intelligence: SmartAgent™," date unknown, [online] Retrieved from the Internet <URL: http://www.ossmanagement.com/SmartAgent.pdf>.
Arcsight, "Product Info: Product Overview and Architecture," date unknown, [online] [Retrieved on Oct. 25, 2002] Retrieved from the Internet <URL: http://www.arcsight.com/product.htm>.
Arcsight, "Product Info: 360° Intelligence Yields Precision Risk Management," date unknown, [online] [Retrieved on Oct. 25, 2002] Retrieved from the Internet <URL: http://www.arcsight.com/product_info01.htm>.
Arcsight, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.
Arcsight, "Product Info: ArcSight Cross-Device Correlation," date unknown, [online] [Retrieved on Oct. 25, 2005] Retrieved from the Internet <URL: http://www.arcsight.com/product_info03.htm>.
Arcsight, "Product Info: ArcSight Manager," date unknown, [online] [Retrieved on Oct. 25, 2002] Retrieved from the Internet <URL: http://www.arcsight.com/product_info04.htm>.
Arcsight, "Product Info: ArcSight Console," date unknown, [online] [Retrieved on Nov. 15, 2002] Retrieved from the Internet <URL: http:www.arcsight.com/product_info05.htm>.
Arcsight, "Product Info: ArcSight Reporting System," date unknown, [online] [Retrieved on Oct. 25, 2002] Retrieved from the Internet <URL: http:www.arcsight.com/product_info06.htm>.
Arcsight, "Product Info: Enterprise Scaling," date unknown, [online] [Retrieved on Oct. 25, 2002] Retrieved from the Internet <URL: http://www.arcsight.com/product_info07.htm>.
Arcsight, "Security Management for the Enterprise," 2002, [online] [Retrieved on Oct. 25, 2002] Retrieved from the Internet <URL: http:www.arcsight.com/>.
Arcsight, "Technical Brief: How Correlation Eliminates False Positives," date unknown, source unknown.
Burleson, D., "Taking Advantage of Object Partitioning in Oracle8i," Nov. 8, 2000, [online] [Retrieved on Apr. 20, 2004] Retrieved from the Internet <URL: http://www.dba-oracle.com/art_partit.htm>.
Derodeff, C. "Got Correlation? Not Without Normalization," 2002, [online] Retrieved from the Internet <URL: http://www.svic.com/papers/pdf/Got-Correlation_rmalization.pdf>.
Cheung, S. et al., "EMERALD Intrusion Incident Report: 601 Message Specification," Aug. 10, 2000, System Design Laboratory, SRI International.
National Institute of Standards and Technology (NIST), "Federal Information Processing Standards Publication (FIPS PUB) 199: Standards for Security Categorization of Federal Information and Information Systems", Feb. 2004.
Haley Enterprise, "Production Systems," 2002, [online] [Retrieved on Oct. 29, 2002] Retrieved from the Internet <URL: http://www.haley.com/0072567836705810/ProductionSystems.html>.
Haley Enterprise, "The Rete Algorithm," 2002, [online] [Retrieved on Oct. 29, 2002] Retrieved from the Internet <URL: http://www.haley.com/0072567836705810/ReteAlgorithm.html>.
Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.
Halme, L.R. et al., "AINT Misbehaving: A Taxonomy of Anti-Intrusion Techniques," 2000, [online] [Retrieved on Nov. 1, 2002] Retrieved from the Internet <URL: http://www.sans.org/newlook/resources/IDFAQ/aint.htm>.
Lindqvist, U. et al., "Detecting Computer and Network Misuse Through the Production-Based Expert System Toolset (P-BEST)," Proceedings of the IEEE Symposium on Security and Privacy, Oakland, California, May 9-12, 1999.
Cert Coordination Center, "Overview of Attack Trends," 2002, [online] Retrieved from the Internet <URL: http://www.cert.org/archive/pdf/attack_trends.pdf>.
Porras, P.A. et al., "EMERALD: Event Monitoring Enabling Responses to Anomalous Live Disturbances," Oct. 1997, Proceedings of the 20th NIST-NCSC National Information Systems Security (NISS) Conference.
Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.
Ingargiola, G., "The Rete Algorithm," date unknown, [online] [Retrieved on Oct. 29, 2002] Retrieved from the Internet <URL: http://yoda.cis.temple.edu:8080/UGAIWWW/lectures/rete.html>.
Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newlook/resources/IDFAQ/matching.htm>.
National Institutes of Health (NIH), "Table 1: Security Categorization of Federal Information and Information Systems," revised Jul. 8, 2005, [online] [retrieved on Apr. 6, 2006] Retrieved from the Internet <URL: http://irm.cit.nih.gov/security/table1.htm>.
Wood, M., et al., "Internet-Draft: Intrusion Detection Message Exchange Requirements," Jun. 23, 2002, [online] [Retrieved on Nov. 1, 2002] Retrieved from the Internet <URL: http://www.silcondefense.com/idwg/draft-ietf-idwg-requirements-07.txt>.
Notification of International Search Report and Written Opinion, PCT/US2005/015933, Dec. 12, 2005.
Examination Report, Intellectual Property Office of New Zealand, New Zealand Patent Application No. 550752, May 8, 2008, 2 Pages.
State of Israel Ministry of Justice, Patents Authority Office Action, Israeli Patent Application No. 178861, Nov. 1, 2010, 4 pages.
Examiner's First Report for Australian Patent Application No. 2005240203, Dec. 21, 2009, 2 Pages.

\* cited by examiner

PATTERN DISCOVERY IN A NETWORK SYSTEM

RELATED APPLICATION

This application is a continuation of U.S. patent application Ser. No. 10/839,613, filed on May 4, 2004, which is incorporated herein by reference.

FIELD OF THE INVENTION

The present invention relates to a computer-based system for capturing events from heterogeneous and homogenous sources, and discovering patterns in the captured events.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, intrusion detection systems (IDS) have been developed to help uncover attempts by unauthorized persons and/or devices to gain access to computer networks and the information stored therein. In addition, network devices such as routers and firewalls maintain activity logs that can be used to examine such attempts.

Intrusion detection may be regarded as the art of detecting inappropriate, incorrect or anomalous activity within or concerning a computer network or system. The most common approaches to intrusion detection are statistical anomaly detection and pattern-matching detection. IDS that operate on a host to detect malicious activity on that host are called host-based IDS (HIDS), which may exist in the form of host wrappers/personal firewalls or agent-based software, and those that operate on network data flows are called network-based IDS (NIDS). Host-based intrusion detection involves loading software on the system (the host) to be monitored and using log files and/or the host's auditing agents as sources of data. In contrast, a network-based intrusion detection system monitors the traffic on its network segment and uses that traffic as a data source. Packets captured by the network interface cards are considered to be of interest if they match a signature.

Regardless of the data source, there are two complementary approaches to detecting intrusions: knowledge-based approaches and behavior-based approaches. Almost all IDS tools in use today are knowledge-based. Knowledge-based intrusion detection techniques involve comparing the captured data to information regarding known techniques to exploit vulnerabilities. When a match is detected, an alarm is triggered. Behavior-based intrusion detection techniques, on the other hand, attempt to spot intrusions by observing deviations from normal or expected behaviors of the system or the users (models of which are extracted from reference information collected by various means). When a suspected deviation is observed, an alarm is generated.

Advantages of the knowledge-based approaches are that they have the potential for very low false alarm rates, and the contextual analysis proposed by the intrusion detection system is detailed, making it easier for a security officer using such an intrusion detection system to take preventive or corrective action. Drawbacks include the difficulty in gathering the required information on the known attacks and keeping it up to date with new vulnerabilities and environments.

Advantages of behavior-based approaches are that they can detect attempts to exploit new and unforeseen vulnerabilities. They are also less dependent on system specifics. However, the high false alarm rate is generally cited as a significant drawback of these techniques and because behaviors can change over time, the incidence of such false alarms can increase.

Regardless of whether a host-based or a network-based implementation is adopted and whether that implementation is knowledge-based or behavior-based, an intrusion detection system is only as useful as its ability to discriminate between normal system usage and true intrusions (accompanied by appropriate alerts). If intrusions can be detected and the appropriate personnel notified in a prompt fashion, measures can be taken to avoid compromises to the protected system. Otherwise such safeguarding cannot be provided. Accordingly, what is needed is a system that can provide accurate and timely intrusion detection and alert generation so as to effectively combat attempts to compromise a computer network or system.

SUMMARY OF THE INVENTION

Patterns can be discovered in events collected by a network system. In one embodiment, the present invention includes collecting and storing events from a variety of monitor devices. In one embodiment, a subset of the stored events is provided to a manager as an event stream. In one embodiment, the present invention further includes the manager discovering one or more previously unknown event patterns in the event stream.

BRIEF DESCRIPTION OF THE DRAWINGS

The present invention is illustrated by way of example, and not limitation, in the figures of the accompanying drawings in which.

DETAILED DESCRIPTION

Figure 1:
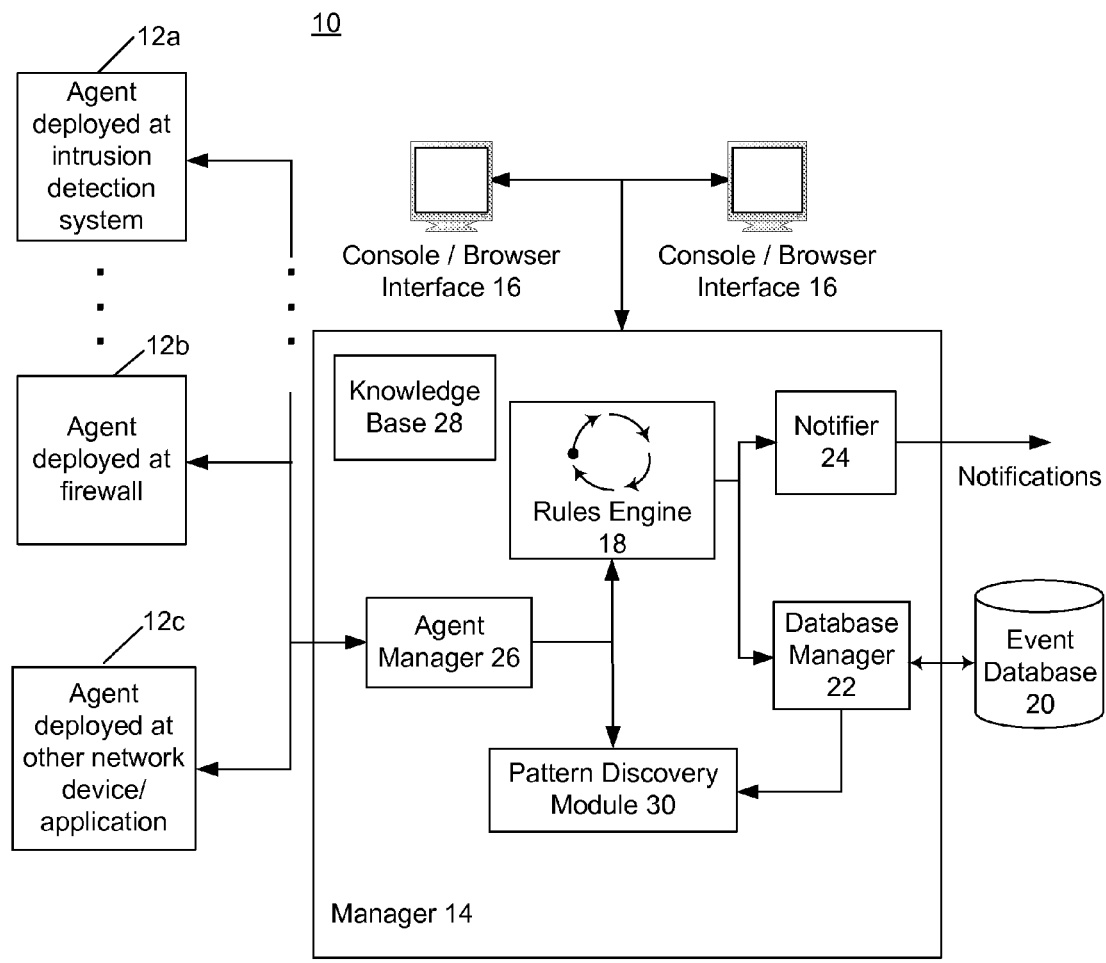
FIG. 1 is a block diagram of a network security system according to one embodiment of the present invention.

Although the present system will be discussed with reference to various illustrated examples, these examples should not be read to limit the broader spirit and scope of the present invention. For example, the examples presented herein describe distributed agents, managers and consoles, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, an example of a computer-based network security system 10 architected in accordance with an embodiment of the present invention is illustrated. System 10 includes agents 12, one or more managers 14 and one or more consoles 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12 are software programs that provide efficient, real-time (or near real-time) local event data capture and filtering from a variety of network security devices and/or applications. The primary sources of security events are common network security devices, such as firewalls, intrusion detection systems and operating system logs. Agents 12 can collect events from any source that produces event logs or messages and can operate at the native device, at consolidation points within the network, and/or through simple network management protocol (SNMP) traps.

Agents 12 are configurable through both manual and automated processes and via associated configuration files. Each agent 12 may include one or more software modules including a normalizing component, a time correction component, an aggregation component, a batching component, a resolver component, a transport component, and/or additional components. These components may be activated and/or deactivated through appropriate commands in the configuration file.

Managers 14 may be server-based components that further consolidate, filter and cross-correlate events received from the agents, employing a rules engine 18 and a centralized event database 20. One role of manager 14 is to capture and store all of the real-time and historic event data to construct (via database manager 22) a complete, enterprise-wide picture of security activity. The manager 14 also provides centralized administration, notification (through one or more notifiers 24), and reporting, as well as a knowledge base 28 and case management workflow. The manager 14 may be deployed on any computer hardware platform and one embodiment utilizes a relational database management system such as an Oracle™ database to implement the event data store component. Communications between manager 14 and agents 12 may be bi-directional (e.g., to allow manager 14 to transmit commands to the platforms hosting agents 12) and encrypted. In some installations, managers 14 may act as concentrators for multiple agents 12 and can forward information to other managers (e.g., deployed at a corporate headquarters).

Consoles 16 are computer- (e.g., workstation-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal or handheld computer (which takes the place of console 16) to provide some or all of the functionality of a console 16. Browser access is particularly useful for security professionals that are away from the consoles 16 and for part-time users. Communication between consoles 16 and manager 12 is bi-directional and may be encrypted.

Through the above-described architecture the present invention can support a centralized or decentralized environment. This is useful because an organization may want to implement a single instance of system 10 and use an access control list to partition users. Alternatively, the organization may choose to deploy separate systems 10 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. Systems 10 can also be deployed in a corporate hierarchy where business divisions work separately and support a rollup to a centralized management function.

The exemplary network security system illustrated in FIG. 1 is described in further detail in U.S. application Ser. No. 10/308,415, entitled "Real Time Monitoring and Analysis of Events from Multiple Network Security Devices", filed Dec. 2, 2002, now issued as U.S. Pat. No. 7,376,969, which is hereby incorporated fully by reference.

In one embodiment of the present invention, the network security system 10 also includes pattern recognition capabilities. In one embodiment, this is implemented on the manager 14 through a pattern discovery module 30, shown in FIG. 1. As shown in FIG. 1, in one embodiment, a set of security events stored in the event database 20 can be provided to the pattern discovery module 30 via the database manager 22 for pattern discovery.

In one embodiment, a user can initiate an event replay from the event database 20 using the console interface 16 by specifying a time period of previously stored security events to replay. Several embodiments for event replay are described in further detail in U.S. patent application Ser. No. 10/308,416 entitled "Method and Apparatus for Exercising and Debugging Correlations for Network Security System," filed Dec. 2, 2002, which is hereby fully incorporated by reference.

In one embodiment, this replayed event stream is provided to the pattern discovery module. In another embodiment, the security events collected from the agents 12 are provided directly to the pattern discovery module 30, which takes a snapshot of the collected events from time to time. In one embodiment, the pattern discovery module 30 is configured to find—in other words discover, detect—patterns of interest in the event stream it is provided.

In one embodiment, the difference between the patterns detected by the pattern discovery module 30 and the patterns identified by the rules engine 18 is that the rules engine 18 finds known patterns in the collected security events, while the pattern discovery module finds previously unknown patterns in the security events. In other words, the rules engine 18 has correlation rules that are applied to the event stream, each rule looking for a specific pattern. However, in one embodiment, the pattern discovery module 30 does not rely on encoded domain knowledge, such as predefined rules or filters, but finds patterns previously unrecognized as such. In one embodiment, the patterns found by the pattern discovery module can be converted into correlation rules to be used by the rules engine 18 thereafter to correlate security events.

In one embodiment, the operation of the rules engine 18 and the pattern discovery module 30 also differ in that the rules engine locates specific instances of the previously known patterns it is looking for. However, in one embodiment, the pattern discovery module 30 is only configured to identify possible patterns. To locate the pattern in the event stream, a rule based on the newly detected pattern can be provided to the rules engine 18.

Figure 2:
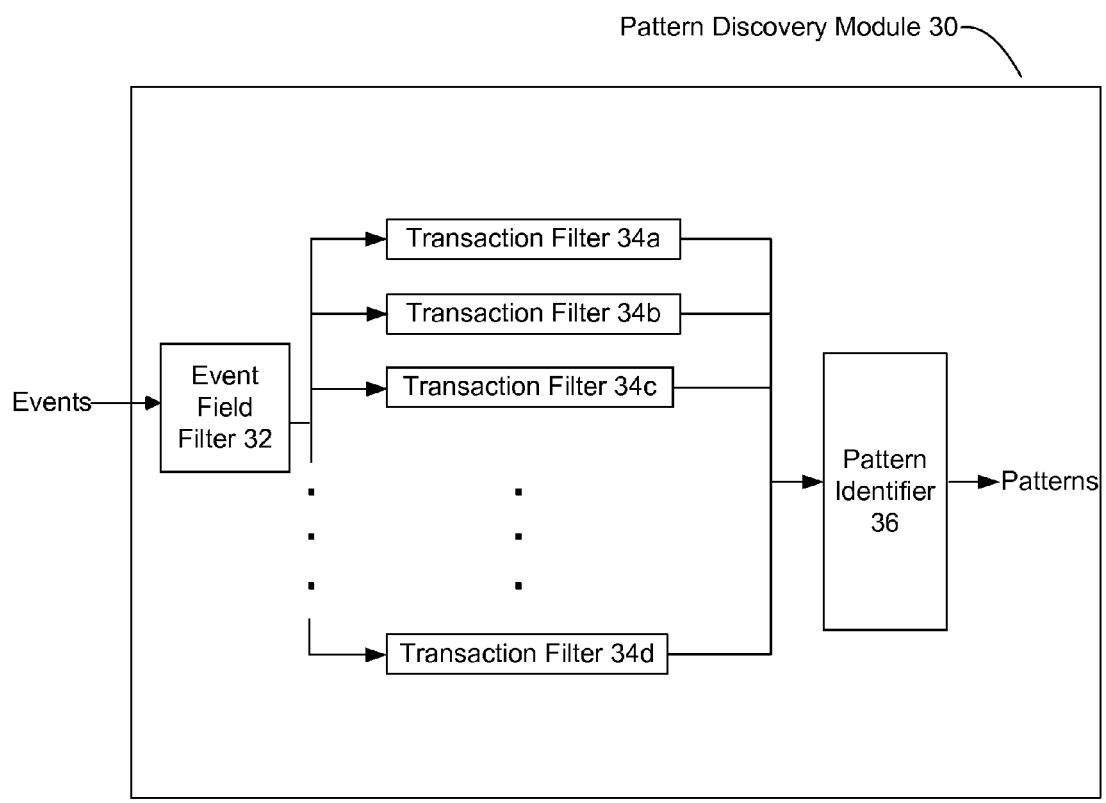
FIG. 2 is a block diagram of a pattern discovery module according to one embodiment of the present invention.

One embodiment of the pattern discovery module 30 is now described in more detail with reference to FIG. 2. As discussed above, the input of the pattern discovery module 30 is an event stream (a collection of security events), provided, in one embodiment, from the event database 20 by the database manager 22. In one embodiment, the pattern discovery module 30 includes an event field filter 32 that retains only selected event fields for each event. For example, event fields not useful for pattern discovery, such fields unique to each event (e.g., unique event identifiers) can be filtered out by the event field filter 32 to conserve memory and increase processing speed.

The event field filter is configured to retain at least the fields used by the transaction filters 34. In one embodiment, the event field filter 32 retains at least the event name field and the source and destination fields. In other embodiments, additional event fields are preserved, such as sensor vendor, product, category, and source and destination port. In one embodiment, there are multiple event field filters 32, one for each transaction filter 34. In such an embodiment, each event field filter 32 would retain at least those fields used by its respective transaction filter 34. The event field filter 32 can be configured to filter out or preserve any individual event field or any subset of event fields, including any combination of the event fields listed above.

In one embodiment, the security events (as represented by the preserved event fields) are used to generate transactions. In one embodiment, a transaction is defined as a group of items representing security events related by some transaction parameter. For example, all events received within some timeframe (e.g., 5 minutes, 30 minutes, one day, one week, one month . . . etc.) can be one transaction. The event stream, which in one embodiment is all the events from some period of time, can be divided into any number of such time-based transactions.

Transactions can also be defined using event rates. In one embodiment, a transaction is defined by a burst of security events. In other words, a large transaction can be further divided into smaller transactions based on event rate. If some statistical analysis of the event stream or large transaction, such as a hidden Markov model, indicates that the event stream is bursty, each burst can be filtered into a transaction.

Transactions can also be defined by event fields. In one embodiment, events originating from the same source address (e.g., source IP address) are defined as transactions. Thus, each such transaction contains all events from one IP address within the timeframe of the event stream.

The transaction parameters can include both source and destination addresses. Thus, some transactions can be defined as all events within a timeframe having the same source and destination IP address (or IP port or both). Furthermore, some transactions can be defined as events exchanged between two participating source/target address (or port) pair. In such an embodiment, security events from address A to B and from B to A would be included in one transaction.

In one embodiment, transactions do not contain actual security events, but items representing security events. One item can represent many identical security events. In this manner significant data can be saved. In one embodiment, each item indicates how many times each security event is being represented. In other embodiments, each security event is merely represented by a single un-numerated item in the transaction.

In one embodiment, the transaction definitions are not mutually exclusive. That is, all of the transaction definitions described above and further below, and any others not described, can be implemented on the same set of security events.

In one embodiment, the transactions are defined by a plurality of transaction filters 34. The ellipsis in FIG. 2 indicates that the security events can be filtered into any number of transactions, and are not limited to the four transaction filters 34 shown in FIG. 2. The transaction filters 34 can be configured to produce any possible transaction discussed above. For example, transaction filter 34a may produce time-based transactions, while transaction filter 34b may produce event field-based transactions.

In one embodiment, the transaction filters also convert the security events into items. As discussed above, an item is defined, in one embodiment, as a description of an event type. When a transaction filter 34 is filling a transaction, duplicate security events may be discarded, or an item count increased, as discussed above.

In one embodiment, transactions can also be "clustered" to generate new transactions. For example, the transaction filters 34 can be configured to cluster two overlapping transactions. Thus, e.g., if one transaction collects items from source A to destination B, and another transaction collects items from source B to destination C, then a third transaction can include items traversing from A to B to C. Other transactions can also overlap. Such clustered transactions can be useful for detecting transactions representing the spreading of worms, and other attacks where destination addresses become source addresses for an attack.

Figure 3:
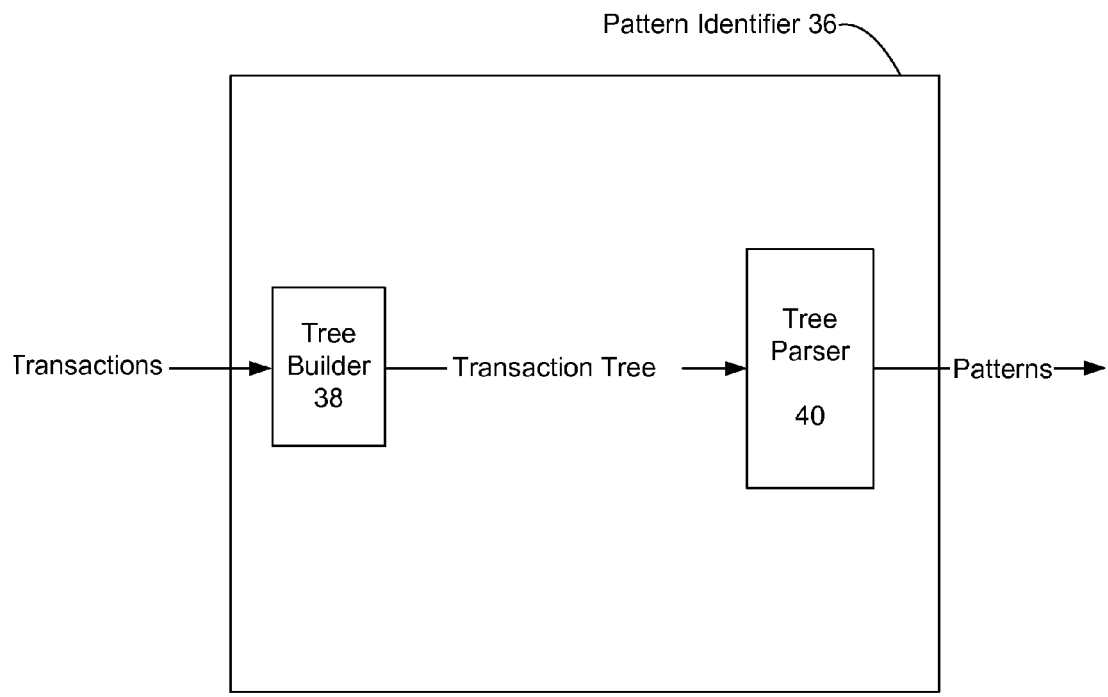
FIG. 3 is a block diagram of a pattern identifier according to one embodiment of the present invention.

In one embodiment, the transactions produced by the transaction filters 34 are provided to the pattern identifier 36. The pattern identifier 36 analyzes the transactions to find the patterns in the event stream. One embodiment of the pattern identifier 36 is now described in more detail with reference to FIG. 3.

In one embodiment, a pattern can be defined as a group of security events that occur together, i.e., are related, in some manner. For example, if security events A, B, and C frequently occur close together, then the event group ABC may be a pattern. On the other hand, if A, B, and C do not occur close together in time, but occur with similar frequency over time, the event group ABC can also be a pattern. An example of a known pattern is a series of unsuccessful logins followed by a successful login. Such a pattern occurs when a dictionary attack is used. A slow and low attack would have events that are not close in time, but related by event frequency.

To identify the event patterns in the security events provided to the pattern discovery module 30, the pattern identifier 36, in one embodiment, first builds a transaction tree from the transactions provided to it by the transaction filter 34 using tree builder 38. In one embodiment, the tree builder 38 first orders the items in each transaction by item support.

In one embodiment, this is done by counting the number of transactions in which each item occurs. This number is sometimes referred to as the "support" of an item. In one embodiment, items need a minimum number of support to stay in the transactions, otherwise they are deleted to reduce the size of the transactions.

Figure 4:
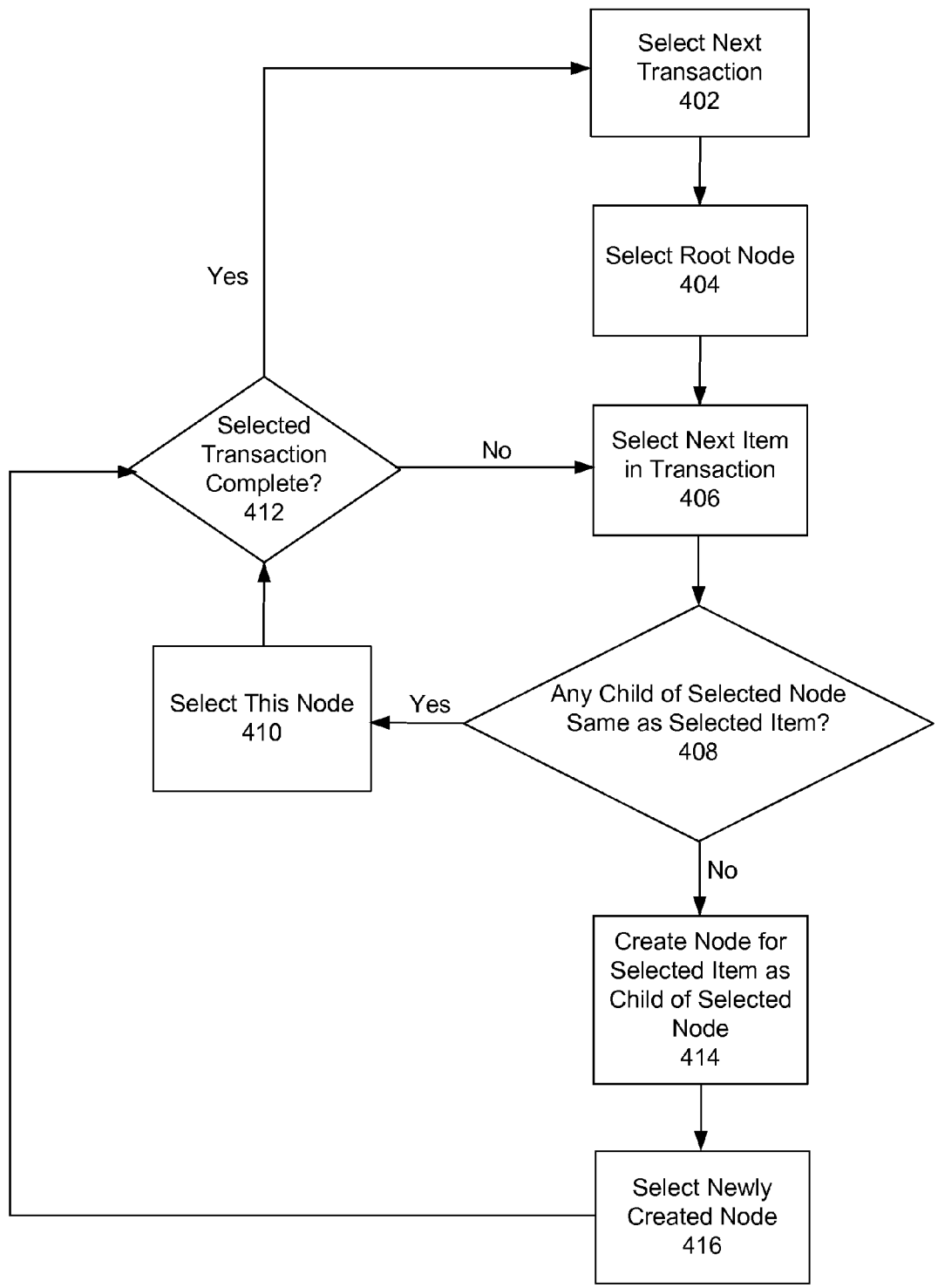
FIG. 4 is a flow chart illustrating a process for transaction tree building according to one embodiment of the present invention.

In one embodiment, the tree builder 38 then organizes the transactions into a tree structure based on the support of each security event. One process for building the transaction tree is now described with reference to FIG. 4. The process illustrated in FIG. 4 operates iteratively one transaction at a time. In one embodiment, the transactions are organized by support from the highest to the lowest supported item.

In block 402 a transaction is selected. In one embodiment, the tree has an empty root node. All other nodes represent items. In block 404 the root node is selected, and in block 406 the next item in the selected transaction is selected, which, in the initial iteration is the first (i.e. highest support) item.

In block 408 a decision is made whether any children of the selected node (the root node in the initial iteration) represent the same item as the selected item. If the answer is yes, then this node becomes the selected node in block 410, and the support of the selected item is added to the current support of the node. However, if the answer is no, then a new child node of the selected node is created to represent the selected item in block 414, and this new node becomes the selected node in block 416.

Next, in block 412, a determination is made whether the selected transaction is fully processed, that is, whether it contains any more items. If the transaction is not complete (more items in transaction), then the processing of the selected transaction continues at block 406 with the selection of the next item in order of support. However, if the selected transaction has been fully processed (no additional items), then the next transaction to be processed is selected in block 402 and the processing continues according to the flow chart in FIG. 4 until all transactions are consumed in the tree building process.

Again with reference to FIG. 3, in one embodiment, the tree builder 38 provides the transaction tree to the tree parser 40, which extracts the patterns of interest from the transaction tree. In one embodiment, the tree parser 40 traverses the tree branches looking for significant drops in support. For example, if one branch of the tree—shown as Item Name (support)—is A(200), B(190), C(50), D(45), then there is a significant drop in support between item B and item C. In this case, the tree parser 40 would identify the group AB as a pattern and the group CD as a pattern. The tree parser may also identify ABCD as a pattern as well. In one embodiment, ABCD being a pattern would not mean that the chronological order of these security events is preserved within the pattern.

In one embodiment, the drop in support is defined by a percentage of decrease. For example, the tree parser 40 defines a drop in support any time support drops by 30 percent or more from one item in a branch to the next. Other percentages can be used as well. In another embodiment, a drop in support is defined by support dropping by a certain number, such as 10.

In yet another embodiment, a drop in support is detected when the addition of the next item in the branch of the tree would cause the standard deviation of the supports thus far considered to go above a threshold number. For example, if the first three branch items' supports' standard deviation is below 0.03, but the addition of the fourth item would cause the standard deviation to be above 0.03, then the tree parser 40 observes a drop in support between the third and fourth items on the branch. The number 0.03 is only an example; other thresholds may be used. Furthermore, other statistical measures of variation can be substituted for the standard deviation, such as the variance.

In one embodiment, the tree parser 40, while traversing the transaction tree also looks for associational factors within the tree. For example, if a group of events occurs in more than one part of the transaction tree, the tree parser 40, in one embodiment, declares that group to be a pattern. In one embodiment, this is done by substituting a representation of a newly identified pattern for all its occurrences in the tree and performing pattern detection on the resultant tree.

In one embodiment, the pattern identifier 36 provides the discovered patterns to the pattern discovery module 30. In one embodiment, the pattern discovery module 30 displays the newly discovered patterns to the user via the console interface 16. The user can make use of the patterns in numerous ways depending on his or her purposes. For example, the user can investigate an event pattern to determine whether it represents a malicious attack or benign activity.

In one embodiment, the user interface provides the user a rule generation tool that enables the user to convert any of the patterns discovered directly into correlation rules to be used by the rules engine 18. Then, the rules engine 18 will detect and find specific instances of the pattern in all future (or replayed) event streams provided to it. In this manner, the newly discovered pattern can become a "previously known" pattern.

In one embodiment, the conversion can be provided using a one-click interface. For example, next to each discovered pattern, the console interface 16 can provide a button labeled "Convert to Rule," which functions to implement the pattern as a correlation rule in the rules engine 18. The user may also be prompted to name the rule.

In the description above, the pattern discovery module 30 is described as taking security events as input and producing patterns in the security events as output. However, the pattern discovery module can also be configured to detect patterns within patterns. In such an embodiment, the pattern discovery module would treat each unique pattern as a unique element, and perform pattern discovery in a manner similar to finding patterns of events.

Thus, a network security system having pattern discovery capabilities has been described. In the foregoing description, various specific values and data structures were given names, such as "security event," "transactions," "transaction tree," and "item." Furthermore, various specific modules, such as the "pattern discovery module" and "pattern identifier" have been described. However, these names are merely to describe and illustrate various aspects of the present invention, and in no way limit the scope of the present invention. Furthermore, various modules, such as the tree builder 38 and tree parser 40 in FIG. 3, can be implemented as software or hardware modules, or without dividing their functionalities into modules at all. The present invention is not limited to any modular architecture either in software or in hardware, whether described above or not.

What is claimed is:

1. A method for discovering an event pattern in an event stream, the event stream comprising a plurality of events, the method comprising:
   using a processor to create a plurality of transactions based on a transaction parameter, wherein each transaction represents a subset of the plurality of events;
   generating a transaction tree based on the plurality of transactions, wherein the transaction tree includes one root node and a plurality of non-root nodes, and wherein each non-root node represents an event;
   traversing a branch of the transaction tree starting at the root node, wherein the branch extends from the root node through a first non-root node to a second non-root node;
   observing a drop in support from the first non-root node to the second non-root node, wherein a support of a non-root node represents a number of transactions that include the event represented by the non-root node; and
   determining that the event pattern includes the event represented by the first non-root node and does not include the event represented by the second non-root node.

2. The method of claim 1, wherein the plurality of events had been stored in an event database.

3. The method of claim 1, wherein the transaction parameter comprises an interval of time, and wherein each transaction represents events that were received during the interval of time.

4. The method of claim 1, wherein the transaction parameter comprises a value of an event field, and wherein each transaction represents events that include the value of the event field.

5. The method of claim 4, wherein the event field comprises a source address.

6. The method of claim 4, wherein the event field comprises a destination address.

7. The method of claim 1, wherein the transaction parameter comprises a point in time, and wherein each transaction represents events that were received proximate to the point in time.

8. The method of claim 1, wherein generating the transaction tree based on the plurality of transactions comprises generating the transaction tree based on a support of an event within the plurality of transactions.

9. The method of claim 1, further comprising removing a field from each event in the plurality of events.

10. The method of claim 9, wherein a value of the field is unique to each event.

11. The method of claim 1, further comprising providing a user an option to convert the event pattern into an event correlation rule.

12. The method of claim 1, further comprising creating an event correlation rule using the event pattern.

13. A method for generating a rule, comprising:
    displaying a pattern discovery tool configured to enable a user to select a subset of previously stored events;
    in response to the user selection:
      using a processor to create a plurality of transactions based on a transaction parameter, wherein each transaction represents a subset of the selected events;
      generating a transaction tree based on the plurality of transactions, wherein the transaction tree includes one root node and a plurality of non-root nodes, and wherein each non-root node represents an event;
      traversing a branch of the transaction tree starting at the root node, wherein the branch extends from the root node through a first non-root node to a second non-root node;
      observing a drop in support from the first non-root node to the second non-root node, wherein a support of a non-root node represents a number of transactions that include the event represented by the non-root node; and
      determining that the event pattern includes the event represented by the first non-root node and does not include the event represented by the second non-root node;
    displaying a rule generation tool configured to enable a user to perform an action; and
    in response to the user action, converting the event pattern into a correlation rule.

14. The method of claim 13, wherein the user action comprises a single mouse-click.

15. A system for discovering an event pattern in an event stream, the event stream comprising a plurality of events, the system comprising
    creating a plurality of transactions based on a transaction parameter, wherein each transaction represents a subset of the plurality of events;
    generating a transaction tree based on the plurality of transactions, wherein the transaction tree includes one root node and a plurality of non-root nodes, and wherein each non-root node represents an event;
    traversing a branch of the transaction tree starting at the root node, wherein the branch extends from the root node through a first non-root node to a second non-root node;
    observing a drop in support from the first non-root node to the second non-root node, wherein a support of a non-root node represents a number of transactions that include the event represented by the non-root node; and
    determining that the event pattern includes the event represented by the first non-root node and does not include the event represented by the second non-root node.

16. The system of claim 15, wherein the transaction parameter comprises an interval of time, and wherein each transaction represents events that were received during the interval of time.

17. The system of claim 15, wherein the transaction parameter comprises a value of an event field, and wherein each transaction represents events that include the value of the event field.

18. The system of claim 15, wherein the transaction parameter comprises a point in time, and wherein each transaction represents events that were received proximate to the point in time.

19. The system of claim 15, wherein generating the transaction tree based on the plurality of transactions comprises generating the transaction tree based on a support of an event within the plurality of transactions.

20. The system of claim 15, wherein the method further comprises removing a field from each event in the plurality of events.

21. The system of claim 15, wherein the method further comprises displaying a user interface to provide a user a tool to convert the event pattern into an event correlation rule.

22. A non-transitory machine-readable storage medium having stored thereon data representing instructions that, when executed by a processor, cause the processor to perform operations comprising:

creating a plurality of transactions based on a transaction parameter, wherein each transaction represents a subset of a plurality of events;

generating a transaction tree based on the plurality of transactions, wherein the transaction tree includes one root node and a plurality of non-root nodes, and wherein each non-root node represents an event;

traversing a branch of the transaction tree starting at the root node, wherein the branch extends from the root node through a first non-root node to a second non-root node;

observing a drop in support from the first non-root node to the second non-root node, wherein a support of a non-root node represents a number of transactions that include the event represented by the non-root node; and determining that the event pattern includes the event represented by the first non-root node and does not include the event represented by the second non-root node.

23. The non-transitory machine-readable storage medium of claim 22, wherein generating the transaction tree based on the plurality of transactions comprises generating the transaction tree based on a support of an event within the plurality of transactions.

24. The non-transitory machine-readable storage medium of claim 22, wherein the operations further comprise removing a field from each event in the plurality of events.

25. The non-transitory machine-readable storage medium of claim 22, wherein the operations further comprise providing a user an option to convert the event pattern into an event correlation rule.

26. The non-transitory machine-readable storage medium of claim 22, wherein the operations further comprise creating an event correlation rule using the event pattern.

\* \* \* \* \*

UNITED STATES PATENT AND TRADEMARK OFFICE
CERTIFICATE OF CORRECTION

| | | |
|---|---|---|
| PATENT NO. | : 7,984,502 B2 | Page 1 of 1 |
| APPLICATION NO. | : 12/243838 | |
| DATED | : July 19, 2011 | |
| INVENTOR(S) | : Saurabh et al. | |

It is certified that error appears in the above-identified patent and that said Letters Patent is hereby corrected as shown below:

In column 10, line 40, in Claim 15, delete "system comprising" and
insert -- system comprising:
a processor configured to execute a method, the method comprising: --, therefor.

Signed and Sealed this
Twenty-fourth Day of July, 2012

David J. Kappos
*Director of the United States Patent and Trademark Office*